United States Patent [19]

Ishiwatari

[11] 4,295,712
[45] Oct. 20, 1981

[54] LIQUID CRYSTAL DISPLAY DEVICE

[75] Inventor: Masumi Ishiwatari, Zushi, Japan

[73] Assignee: Canon Kabushiki Kaisha, Tokyo, Japan

[21] Appl. No.: 60,281

[22] Filed: Jul. 25, 1979

[30] Foreign Application Priority Data

Aug. 19, 1978 [JP] Japan .................... 53-99994

[51] Int. Cl.³ .......................................... G02F 1/133
[52] U.S. Cl. ..................... 350/344; 350/337; 350/338
[58] Field of Search ............... 350/344, 337, 338

[56] References Cited

U.S. PATENT DOCUMENTS

| | | | |
|---|---|---|---|
| 3,886,014 | 5/1975 | Bayer | 350/344 X |
| 4,025,688 | 5/1977 | Nagy et al. | 350/337 X |
| 4,150,878 | 4/1979 | Barzilai et al. | 350/344 |
| 4,193,287 | 3/1980 | Pfeiffer | 350/337 X |

*Primary Examiner*—Edward S. Bauer
*Attorney, Agent, or Firm*—Fitzpatrick, Cella, Harper & Scinto

[57] ABSTRACT

A liquid crystal display device of a type, wherein a pair of flexible, transparent plates, each having on one surface thereof a transparent electrode to form thereon desired characters, patterns, and so forth, are arranged with the transparent electrodes opposed to each other, a spacer to maintain a constant space gap between the opposed transparent electrodes is provided between the pair of flexible, transparent plates uniformly over the entire surface thereof, and liquid crystal is sealed in a space defined between the two electrodes the distance of which is maintained constant by the spacer, and the spacer has a dot or linear structure.

3 Claims, 2 Drawing Figures

LIQUID CRYSTAL DISPLAY DEVICE

BACKGROUND OF THE INVENTION

1. Field of the Invention

This invention relates to a liquid crystal display device for use in various display devices of electronic appliances, particularly, electronic desk or pocket type calculators.

2. Description of the Prior Arts

At the present stage, electronic calculators tend to be reduced in dimension, particularly, thickness, owing to remarkable developments in electronic circuit technology. On account of this, the demand had been increasing in thinning the liquid crystal display device (hereinafter abbreviated as "LCD") for use in such calculators. Since the conventional display device is made of glass, it easily breaks when thinned too much, or since a space gap, in which the liquid crystal is sealed, is as thin as a few micrometers, the space gap is readily narrowed even with a very slight external force being applied thereto to cause undesirable running of the liquid crystal and generation of the Newton ring, and various other problems. In view of such problems inherent in the conventional structure of the liquid crystal display device, it is almost impossible to attain the desired reduction in thickness of the display device.

SUMMARY OF THE INVENTION

The present invention is proposed in view of the abovementioned problems in the heretofore known liquid crystal display device, and aims at providing the ideal LCD which is sufficiently thin, has sufficient flexibility, and does not cause generation of the Newton ring or running of the liquid crystal, even when it is bent.

DESCRIPTION OF THE PREFERRED EMBODIMENTS

In the following, the present invention will be explained in more detail in reference to preferred embodiments shown in the accompanying drawing.

Figure 1:
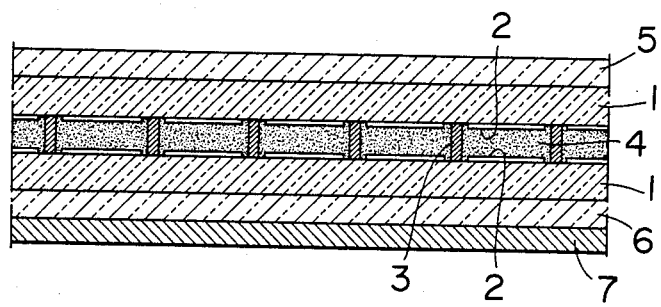
FIG. 1 is a side elevational view, in cross-section, showing one embodiment of the liquid crystal display device according to the present invention.

Referring first to FIG. 1, a reference numeral 1 designates a flexible, transparent plastic plate having on one surface thereof a transparent electrode 2 to form thereon desired characters, letters, patterns, and so forth. The transparent electrode 2 is formed on the plastic plate 1 by evaporation. A pair of the flexible, transparent plastic plates, each being of the abovementioned structure, are arranged with a space gap therebetween and with the electrodes 2 opposing each other. Also, with a view to maintaining constant the space gap between the opposed electrodes, a plurality of spacers 3 made of insulative plastic or glass fiber are interposed between the upper and lower plastic plates, 1—1, in a dot shape, in the illustrated case, so that the spacers are arranged between the adjacent electrodes. With these spacers, the space gap between the flexible, transparent plastic plates can be maintained constant, and liquid crystal 4 can be sealed in this space between the upper and lower electrodes. Incidentally, reference numerals 5, 6 designates flexible deflecting plates, and a numeral 7 refers to a flexible reflecting plate.

With the above-described construction, the LCD possesses sufficient flexibility, and the space gap between the upper and lower electrodes is always maintained constant, and hence there is no apprehension of the device being broken, even if it is formed thin. Also, running of the liquid crystal and generation of the Newton ring are prevented owing to the function of the abovementioned spacers 3, even when it is bent.

Figure 2:
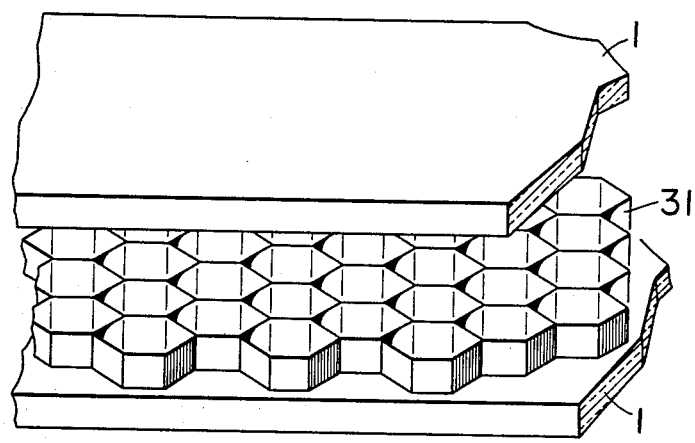
FIG. 2 is an exploded, perspective view of a modified embodiment of the liquid crystal display device.

FIG. 2 illustrates another embodiment of the LCD according to the present invention, wherein a spacer 31 is in a honeycomb structure. In this structure of the spacer, since the upper and lower plastic plates 1 are made to contact with the spacer 31 in linear contact, it provides high strength against external force, and the running of the liquid crystal is prevented more effectively. In this case, the spacer appears in a thin network form at the display section, although it is almost unnoticeable. More preferable result can be obtained, if this spacer is constructed with a transparent material.

What I claim is:

1. A liquid crystal display device comprising:
   a pair of flexible, transparent plates each having a transparent electrode on one surface; and
   a spacer interposed between said plate surfaces for maintaining a constant space gap therebetween, said spacer being a honeycomb-shaped structure which extends over the entire display device surface.

2. A liquid crystal device according to claim 1, wherein a flexible deflecting plate is provided outside each of said flexible, transparent plates.

3. A liquid crystal device according to claim 1, wherein a flexible reflecting plate is provided outside one of said flexible, transparent plates.

* * * * *